United States Patent
Duprey et al.

(10) Patent No.: US 10,203,874 B1
(45) Date of Patent: Feb. 12, 2019

(54) MANAGING TIME SCHEDULED DATA PLACEMENT IN DATA STORAGE SYSTEMS

(71) Applicant: EMC Corporation, Hopkinton, MA (US)

(72) Inventors: Dennis Thomas Duprey, Raleigh (NC); Qin Tao, Hopkinton, MA (US); Xiaoye Jiang, Shrewsbury, MA (US); Khang Can, Framingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 204 days.

(21) Appl. No.: 14/872,132

(22) Filed: Sep. 30, 2015

(51) Int. Cl.
*G06F 3/06* (2006.01)
(52) U.S. Cl.
CPC .......... *G06F 3/0604* (2013.01); *G06F 3/0646* (2013.01); *G06F 3/0673* (2013.01)
(58) Field of Classification Search
CPC .............................. G06F 3/0605; G06F 3/0604
See application file for complete search history.

(56) References Cited

U.S. PATENT DOCUMENTS

| | | | | |
|---|---|---|---|---|
| 7,529,903 B2* | 5/2009 | Boss | ...................... | G06F 3/0605 711/165 |
| 9,052,823 B2* | 6/2015 | Yamamoto | ............ | G06F 3/0605 |
| 2013/0326183 A1* | 12/2013 | Bavishi | .................. | G06F 3/0647 711/165 |
| 2015/0081964 A1* | 3/2015 | Kihara | .................. | G06F 3/0611 711/114 |

OTHER PUBLICATIONS

Glassborow, Martin, Automated storage tiering product comparison, ComputerWeekly.com, Apr. 2011. http://www.computerweekly.com/feature/Automated-storage-tiering-product-comparison.*

* cited by examiner

*Primary Examiner* — Ryan Bertram
*Assistant Examiner* — Edmund H Kwong
(74) *Attorney, Agent, or Firm* — Krishnendu Gupta; Jason Reyes; Anne Marie Dinius

(57) ABSTRACT

A technique for managing temporal data placement in data storage systems is disclosed. An application program interface (API) is provided, where a host application is configured to communicate sub-LUN data segment location, application configuration tiering, and timing parameter information to the API. The sub-LUN data segment location, application configuration tiering, and timing parameter information is transmitted to the data storage system via an out-of-band communications path. The sub-LUN data segment location, application configuration tiering, and timing parameter information is received at the data storage system and associated with the corresponding LUN. A timing estimate for implementing sub-LUN data segment relocation is generated based on system derived tiering information and recent relocation timing information. Relocation of the sub-LUN data segment is scheduled such that the sub-LUN data segment is relocated to a tier corresponding to the application configuration tiering information during the time period associated with the timing parameter.

18 Claims, 8 Drawing Sheets

MANAGING TIME SCHEDULED DATA PLACEMENT IN DATA STORAGE SYSTEMS

BACKGROUND

Technical Field

This application relates generally to managing temporal data placement in data storage systems.

Description of Related Art

Data storage systems are arrangements of hardware and software that include storage processors coupled to arrays of non-volatile storage devices. In typical operation, storage processors service storage requests that arrive from client machines. These storage requests may specify files or other data elements to be written, read, created, or deleted. The storage processors run software that manages incoming storage requests and performs various data processing tasks to organize and secure the data stored on the non-volatile storage devices.

These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

A technique for managing temporal data placement in data storage systems is disclosed. An application program interface (API) is provided, where a host application is configured to communicate sub-LUN data segment location, application configuration tiering, and timing parameter information to the API. The sub-LUN data segment location, application configuration tiering, and timing parameter information is transmitted to the data storage system via an out-of-band communications path. The sub-LUN data segment location, application configuration tiering, and timing parameter information is received at the data storage system and associated with the corresponding LUN. A timing estimate for implementing sub-LUN data segment relocation is generated based on system derived tiering information and recent relocation timing information. Relocation of the sub-LUN data segment is scheduled such that the sub-LUN data segment is relocated to a tier corresponding to the application configuration tiering information during the time period associated with the timing parameter.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
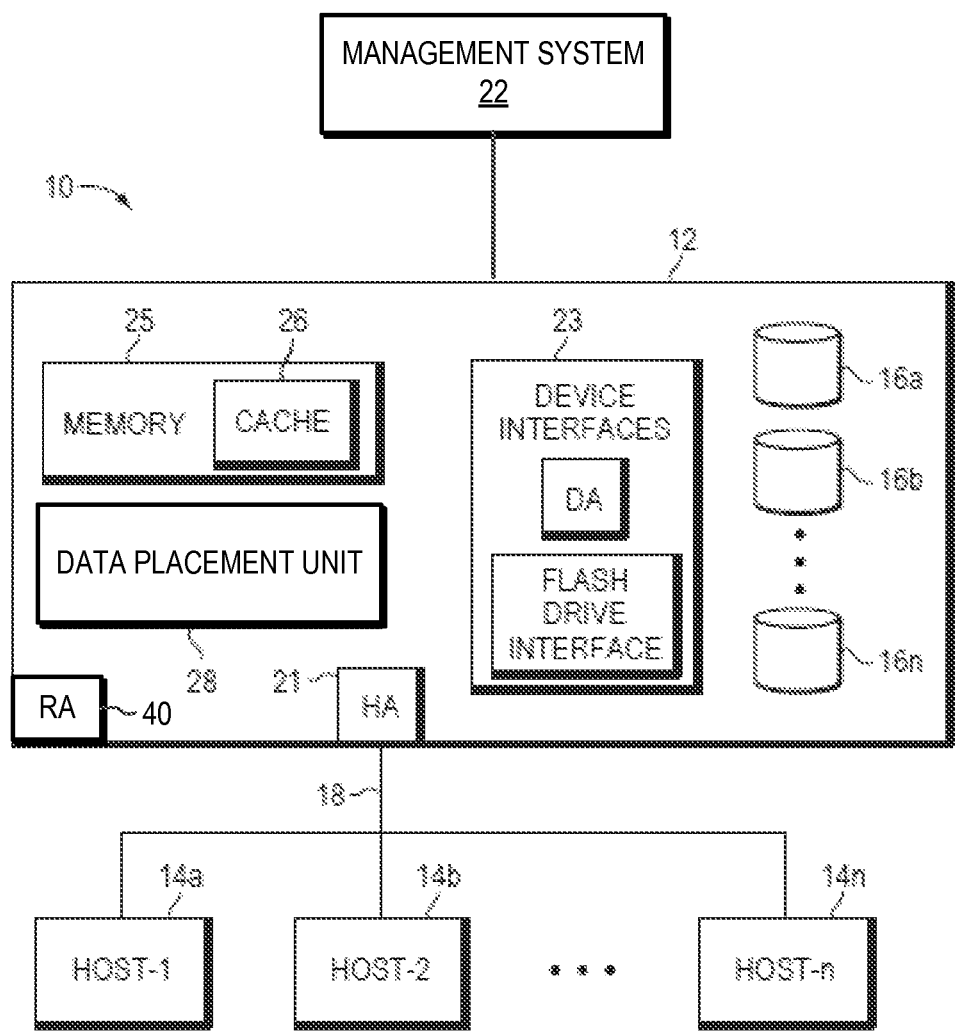
FIG. 1 is an example of a system that may utilize the technique described herein comprising a data storage system connected to host systems through a communication medium.

Hybrid data storage systems contain heterogeneous types of disk drives which offer different performance, price and capacity for various applications deployment. Each application can have one or more different data placement profiles on different storage tiers to best optimize application performance and reduce system cost. User/host applications optimal data tiering placement can change during certain time periods. For example, company financial reports are typically produced at the end of each quarter when quarterly sales and revenue figures become available. The current and past sales and revenue figures are combined for use in financial reports. Giving reporting deadlines, these reports must be created quickly. Thus, having the data on higher performing storage tiers as soon as work on the reports, rather than waiting for conventional Fully Automated Storage Tiering (FAST) tiering mechanisms to promote the data, can provide a significant benefit. After the reports are completed, the data can be moved down to lower performing tiers for the remainder of the quarter so that space on the higher performing tiers can be freed up for other performance sensitive work.

Conventional tiering methods promote, on a LUN by LUN basis, hot data to high performing tiers and cold data to lower performing tiers. These methods are applied on a LUN by LUN basis, that is, the tiering method is applied to all the data in a LUN. This may work well for arranging data by temperature such that data frequently accessed is typically in a high performance tier. However, there are instances where a user may want a particular subset of data (i.e., a sub-LUN segment) to be stored in a particular tier independent of temperature. For example, there may be a subset of data in a database that is used for a short time period only at the end of a calendar quarter. Since the data is not accessed for much of the quarter, conventional tiering methods may classify this data as cold data and will eventually demote it to a lower performing tier.

As will be described in further detail below, the techniques presented herein provide APIs between host and array through out-of-band management to allow an application to configure certain data segments with an application tiering preference and time parameter information. The APIs can provide a mechanism to enable application specific tiering such that an application can specify a particular tiering parameter for sub-LUN data segments. The API also provides timing information to be associated with specified data segments such that the application specific tiering preference is applied during one or more particular time periods. The array may honor the data placement according to the request and also relocate data to the preferred tier during FAST VP relocation window.

Conventional FAST tiering lacks such time based, application configured tiering mechanisms and instead rely on temperature based data relocation. Such methods can take days before cold data is eventually migrated to a high performance tier.

By contrast, employing the techniques described herein allow implementing application specific tiering at a sub-LUN/LBA level wherein the preference includes an implementation time component. The application specific tiering techniques presented herein can temporally override conventional FAST tiering for the sub-LUN data segments while allowing tiering to be performed on non-specified sub-LUN data segments to be performed in the usual manner. Thus, in the financial data example presented above, a financial application can assign financial data in particular LBA ranges to a high performance tier and can assign a time component such that the prior quarter financial data can be made available on high performing tiers when such performance is desired.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a 14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the memory. In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the memory portion 25 may be used to facilitate data transfers and other communications between the device interfaces, HAs and/or RAs in a data storage array. In one embodiment, the device interfaces 23 may perform data operations using a cache 26 that may be included in the memory 25, for example, when communicating with other device interfaces and other components of the data storage array.

The data storage array may also include one or more data placement units 28. As will be described if further detail below, the data placement unit 28 may be configured to override LUN tiering preference and migrate data to a user specified tier where the data may be moved in sub-LUN size chunks. Migration may be accomplished by copying the data and changing the map entries for the logical addresses that were involved to reflect the new logical to physical association.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

In some embodiments, it may also be possible to bind or designate a set of data storage resources, such as logical and/or physical devices, a portion of cache 26, and services, such as a software vendor's service for providing data replication, to one or more of the tiers. The set of resources associated with or designated for use by a tier or grouping within a pool may be characterized as a dynamic binding in that the particular set of data storage system resources associated with a tier may vary from time to time. This binding or association of logical to physical may be kept by making or updating entries in the map. Also, the configuration for the data storage system, aspects of the current data storage system resources (e.g., types of devices, device storage capacity and physical device characteristics related to speed and time to access data stored on the device), and current workload and other dynamic aspects (e.g., actual observed performance and utilization metrics) of the data storage system, may also change over time.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs) (not shown). Each of the SPs may be a CPU including one or more "cores" or processors and each may have their own memory used for communication between the different front end and back end components rather than utilize memory accessible to all storage processors. In such embodiments, memory 26 may represent memory of each such storage processor.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes or properties. The attributes may include any one or more of a storage type or storage technology, device performance characteristic(s), RAID (Redundant Array of Independent Disks) group configuration, storage capacity, and the like. RAID groups are known in the art. The PDs of each RAID group may have a particular RAID level (e.g., RAID-1, RAID-5 3+1, RAID-5 7+1, and the like) providing different levels of data protection. For example, RAID-1 is a group of PDs configured to provide data mirroring where each data portion is mirrored or stored on 2 PDs of the RAID-1 group. The storage type or technology may specify whether a physical storage device is an SSD (solid state drive) drive (such as a flash drive), a particular type of SSD drive (such using flash memory or a form of RAM), a type of rotating magnetic disk or other non-SSD drive (such as a 10K RPM rotating disk drive, a 15K RPM rotating disk drive), and the like. Performance characteristics may relate to different performance aspects of the physical storage devices of a particular type or technology. For example, there may be multiple types of rotating disk drives based on the RPM characteristics of the disk drives where disk drives having different RPM characteristics may be included in different storage tiers. Storage capacity may specify the amount of data, such as in bytes, that may be stored on the drives. An embodiment may define one or more such storage tiers. For example, an embodiment in accordance with techniques herein that is a multi-tiered storage system may define two storage tiers including a first tier of all SSD drives and a second tier of all non-SSD drives. As another example, an embodiment in accordance with techniques herein that is a multi-tiered storage system may define three storage tiers including a first tier of all SSD drives which are flash drives, a second tier of all 15K RPM rotating disk drives, and a third tier of all 7.210K RPM rotating disk drives. In terms of general expected performance, the SSD or flash tier may be considered the highest performing tier. The second tier of 15K RPM disk drives may be considered the second or next highest performing tier and the 10K 7.2K RPM disk drives may be considered the lowest or third ranked tier in terms of expected performance. The foregoing are some examples of tier definitions and other tier definitions may be specified and used in an embodiment in accordance with techniques herein.

Figure 2:
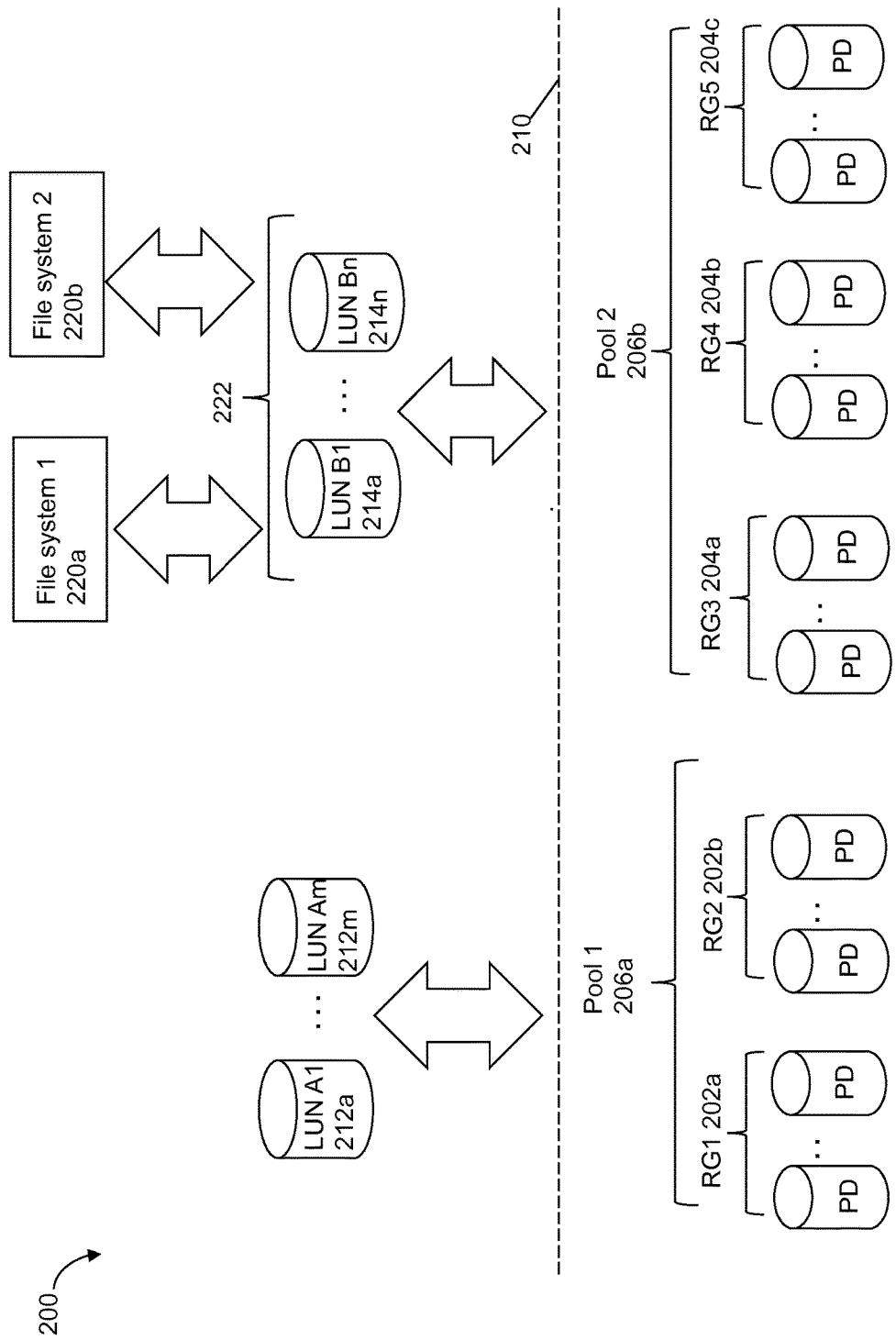
FIG. 2 is a block diagram illustrating an example embodiment in additional detail that may utilize the techniques described herein.

In a data storage system in an embodiment in accordance with techniques herein, PDs may be configured into a pool or group of physical storage devices where the data storage system may include many such pools of PDs such as illustrated in FIG. 2. Each pool may include one or more configured RAID groups of PDs.

Depending on the particular embodiment, each pool may also include only PDs of the same storage tier with the same type or technology, or may alternatively include PDs of different storage tiers with different types or technologies. For example, with reference to FIG. 2, a first pool, pool 1 2016a, may include a first RAID group (RG) of 10K RPM rotating disk drives (denoted as RG1 202a) of one storage tier and also include a second RG of flash-based drives (denoted as RG2 202b) of another storage tier. A second pool, pool 2 206b, may include 3 RGs (denoted RG3 204a, RG 4 204b and RG 5 204c) each of which includes only flash-based drives of the foregoing other storage tier.

The components illustrated in the example 200 below the line 210 may be characterized as providing a physical view of storage in the data storage system and the components illustrated in the example 200 above the line 210 may be characterized as providing a logical view of storage in the data storage system. The pools 206a-b and RGs 202a-b, 204a-c of the physical view of storage may be further configured into one or more logical entities, such as LUNs or logical devices. For example, LUNs 212a-m may be configured from pool 1 206a and LUNs 214a-n may be configured from pool 206b.

A data storage system may support one or more different types of logical devices presented as LUNs. For example, a data storage system may provide for configuration of thick or regular LUNs and also virtually provisioned or thin LUNs. A thick or regular LUN is a logical device that, when configured to have a total usable capacity such as presented to a user for storing data, has all the physical storage provisioned for the total usable capacity. In contrast, a thin or virtually provisioned LUN having a total usable capacity (e.g., a total logical capacity as published or presented to a user) is one where physical storage may be provisioned on demand, for example, as data is written to different portions of the LUN's logical address space. Thus, at any point in time, a thin or virtually provisioned LUN having a total usable capacity may not have an amount of physical storage provisioned for the total usable capacity. The granularity or the amount of storage provisioned at a time for virtually provisioned LUN may vary with embodiment. In one embodiment, physical storage may be allocated, such as a single allocation unit of storage, the first time there is a write to a particular target logical address (e.g., LUN and location or offset on the LUN). The single allocation unit of physical storage may be larger than the size of the amount of data written and the single allocation unit of physical storage is then mapped to a corresponding portion of the logical address range of a LUN. The corresponding portion of the logical address range includes the target logical address. Thus, at any point in time, not all portions of the logical address space of a virtually provisioned device may be associated or mapped to allocated physical storage depending on which logical addresses of the virtually provisioned LUN have been written to at a point in time.

It should be noted that the total usable capacity denoting a total logical capacity of LUNs (where at least one of the LUNs is a thin LUN) configured from a pool may exceed the physical capacity of the underlying PDs. For example, the total usable capacity denoting the total logical capacity of LUNs 212a-m, which includes at least one thin LUN, may exceed the amount of physical storage capacity of PDs of the pool 1 206a. Similarly, the total usable capacity denoting the total logical capacity of LUNs 214a-n, which includes at least one thin LUN, may exceed the amount of physical storage capacity of PDs of the pool 2 206b. The amount by which the total logical capacity or total usable capacity of all LUNs in a specified set exceeds the physical storage capacity, such as of a pool, may be referred to as an oversubscribed capacity.

LUNs configured from a pool may be further mapped to one or more other logical entities. For example, referring again to FIG. 2, group 222 of LUNs 214a-n may be configured as thin or virtually provisioned LUNs which are used to provide physical storage for file systems, such as file system 1 220a and file system 2 220b. The file systems 220a-b may be any suitable file system known in the art such as an NFS (Network File System) file system or a CIFS (Common Internet File System) file system.

Figure 3:
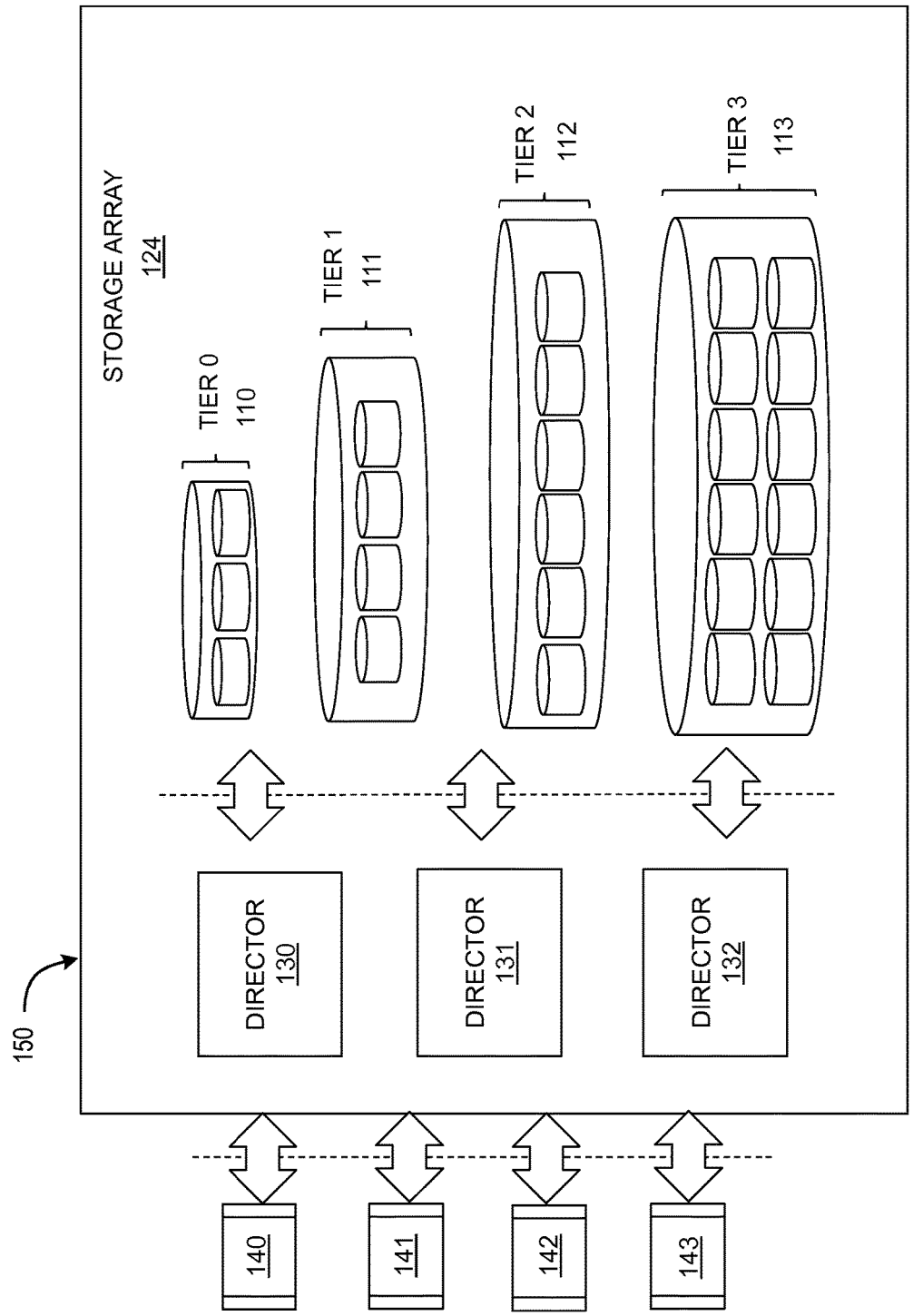
FIG. 3 is a block diagram illustrating an example embodiment in additional detail that may utilize the techniques described herein.

FIG. 3 is a schematic illustration showing a storage system 150 that may be used in connection with an embodiment of the system described herein. The storage system 150 may include a storage array 124 having multiple directors 130-132 and multiple storage volumes (LVs, logical devices or VOLUMES 0-3) provided in multiple storage tiers, TIERS 0-3, 110-113. Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed above.

The multiple storage tiers (TIERS 0-3) may have different storage characteristics, such as speed, cost, reliability, availability, security and/or other characteristics. As described above, a tier may represent a set of storage resources, such as physical storage devices, residing in a storage platform. Examples of storage disks that may be used as storage resources within a storage array of a tier may include sets SATA disks, FC disks and/or EFDs, among other known types of storage devices.

According to various embodiments, each of the tiers 110-113 may be located in different storage tiers. Tiered storage provides that data may be initially allocated to a particular fast tier, but a portion of the data that has not been used over a period of time (for example, three weeks) may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage.

In an embodiment, the system described herein may be used in connection with a Fully Automated Storage Tiering for Virtual Pools (FAST VP) VP product produced by EMC Corporation of Hopkinton, Mass., that provides for the optimization of the use of different storage tiers including the ability to easily create and apply tiering policies (e.g., allocation policies, data movement policies including promotion and demotion thresholds, and the like) to transparently automate the control, placement, and movement of data within a storage system based on business needs. For example, different techniques that may be used in connection with the data storage optimizer are described in U.S. patent application Ser. No. 13/466,775, filed May 8, 2012, entitled PERFORMING DATA STORAGE OPTIMIZATIONS ACROSS MULTIPLE DATA STORAGE SYSTEMS, and U.S. patent application Ser. No. 13/929,664, filed Jun. 27, 2013, entitled MANAGING DATA RELOCATION IN STORAGE SYSTEMS, both of which are incorporated by reference herein.

Figure 4:
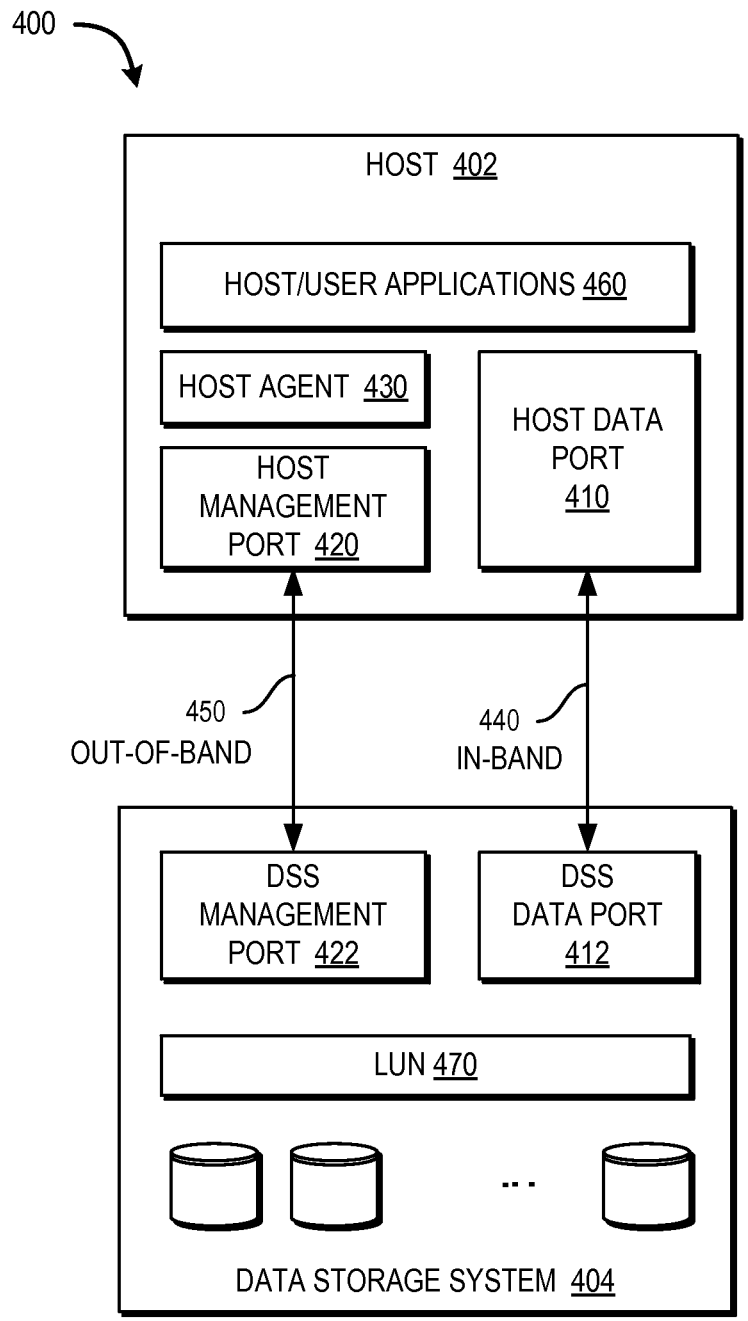
FIG. 4 is a block diagram illustrating an example embodiment in additional detail that may utilize the techniques described herein.

Referring to FIG. 4, shown is an example illustrating a host and data storage system that may utilize techniques described herein. The example 400 includes a host 402 and data storage system 404. The host 402 and data storage system 404 may be as described elsewhere herein such as in connection with FIGS. 1 and 2 with details omitted for simplicity of illustration. Additionally, host agent 430 may be executing on host 430. Example host agents 430 include an application program interface(s) (API), a library, software agent, and the like. In an environment such as a SAN environment, the host 402 and data storage system 404 may communicate using two channels or communication connections: an in-band communication connection 440 and the out-of-band communication connection 450.

The in-band communication connection 440 may be a channel of the data path over which the host 402 may issue I/O or data requests to the data storage system 404. I/O or data requests may by generated by user and/or host applications 460 and be communicated via the host data port 410. In response to such application I/O requests transmitted by the host over in-band connection 440, the data storage system 404 may provide any requested data to the host over the in-band connection 440. The in-band connection 440 may be, for example, a Fibre channel (e.g., FCoE (Fibre channel over Ethernet)) or iSCSI communication channel. It should be noted that the data path may comprise multiple connections 440 used as in-band communication connections over which I/O requests may be issued by the host, and requested data may be returned to the host by the data storage system. An in-band communication connection 440 may be between a host data port 410 and a data storage system (DSS) data port 412. A host data port 410 may be a port of the host, such as included in a host bus adapter (HBA), used for an in-band communication connection of the data path. Similarly, a DSS data port 412 may be a port of the data storage system 404 used for an in-band communication connection of the data path.

The out-of-band communication connection 450 may be a management channel path over which commands, requests, data, and the like, may be exchanged between the host 402 and the data storage system 404 for data storage management. Such requests sent over the out-of-band connection 450 (e.g., management path rather than data path) are not I/O requests for user data stored on the data storage system 404. Rather, the out-of-band connection 450 may be, for example, a communication channel of the management IP network. It should be noted that the management path may comprise multiple connections 450 used as out-of-band communication connections. An out-of-band communication connection 450 may be between a host management port 420 and a data storage system (DSS) management port 422. A host management port 412 may be a port of the host, such as included in a network card having management ports, used for an out-of-band communication connection of the management path. Similarly, a DSS management port 422 may be a port, such as a networking port, of the data storage system 404 used for an out-of-band communication connection of the management path. Thus, as will be described in example embodiments below, the host agent 430 and host management port 420 may be configured to enable user applications 460 to communicate specific management information to the data storage system 404. Such information may be used to control data placement of specific sub-LUN segments separate from other LUN segments and/or LUN tiering preferences.

Figure 5:
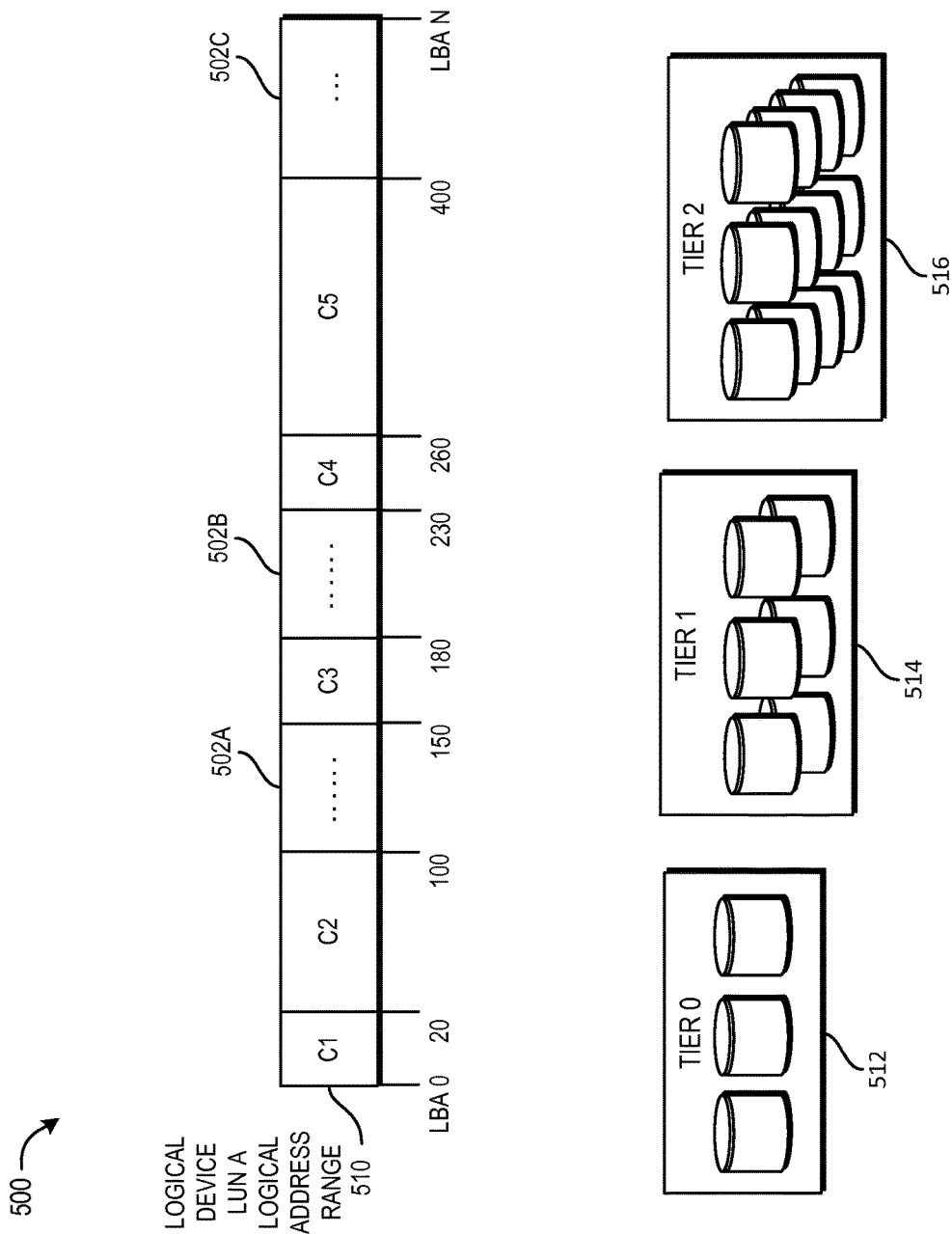
FIG. 5 is a block diagram illustrating an example embodiment that may utilize the techniques described herein.

Referring to FIG. 5, shown is an example 500 illustrating use of a thin device in an embodiment in accordance with techniques herein. The example 500 includes three storage pools 512, 514 and 516 with each such pool representing a storage pool of a different storage tier. For example, pool 512 may represent a storage pool of tier 0 of flash storage devices, pool 514 may represent a storage pool of tier 1 of FC storage devices, and pool 516 may represent a storage pool of tier 2 of SATA storage devices. Each storage pool may include a plurality of logical devices and associated physical devices (or portions thereof) to which the logical devices are mapped. Element 510 represents the thin device address space or range including sub-LUN chunks which are mapped to different storage pools. For example, element chunks C1 and C2 may be mapped to storage pool 512 and element chunks C3 and C4 may be mapped to storage pool 514. Element 510 may be a representation for a first thin device which is included in a storage group of one or more thin devices. It should be noted that although the example 500 illustrates only a single storage pool per storage tier, an embodiment may also have multiple storage pools per tier.

Figure 6:
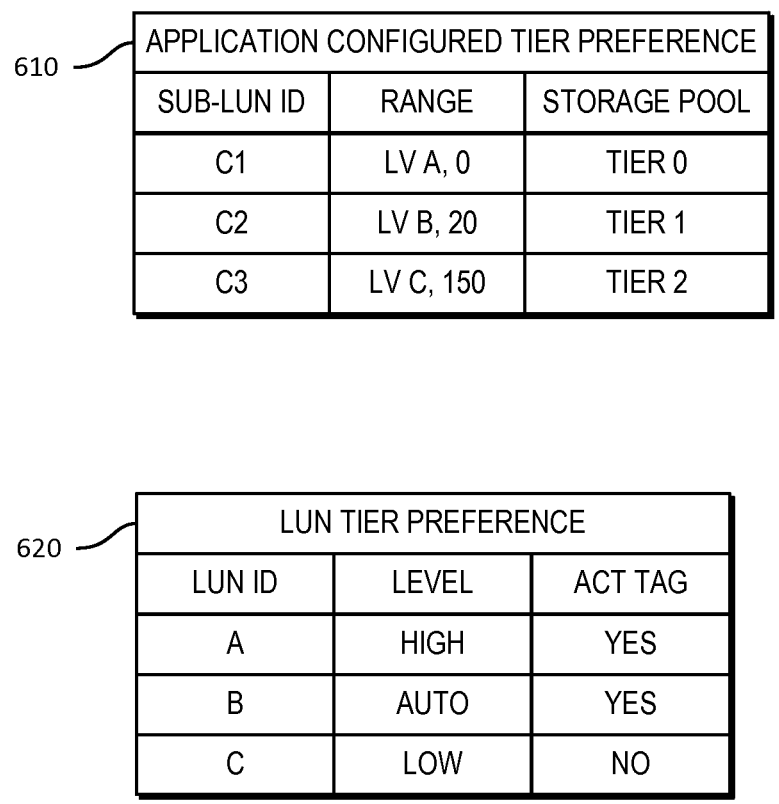
FIG. 6 is an example of tables of application and LUN tiering preference information used in an example embodiment in accordance with the techniques described herein.

Referring to FIG. 6, shown is an example representation of information that may be included in an allocation map for application configured tiering preference in an example embodiment in accordance with techniques herein. An allocation map may be used to identify the mapping for each thin LUN device (TD) sub-LUN chunk, that is, where each chunk is physically located ("thin LUN" "thin device" "TD" and "LUN" may be used interchangeably herein). Allocation map 610 represents a table that may be maintained for each TD. In this example, allocation map 610 represents information as may be maintained for a single TD although another allocation map may be similarly used and maintained for each other TD in a storage group. Allocation map 610 may represent mapping information as illustrated in FIG. 5 such as in connection the mapping of 510 to different storage pool and tiers. The Allocation map 610 may contain an entry for each sub-LUN chunk and identify which LV and associated physical storage is mapped to the chunk. For each entry or row of the Allocation map 610 corresponding to a sub-LUN chunk, a first column, "sub-LUN ID," denotes an identifier to uniquely identify the sub-LUN chunk of the TD, a second column, "range," indicates range information denoting LBA information about the LV and may include offset and length to identify where the chunk is mapped, and a third column, "storage pool," denotes the tier information. For example, the first row represents chunk C1 corresponding to C1 in FIG. 5, the second row represents chunk C2 corresponding to C1, and the third row represents chunk C3 corresponding to C3. It should be noted that although not illustrated, the allocation map may include or otherwise use other tables and structures which identify a further mapping for each LV such as which physical device locations map to which LVs. Such information as illustrated and described in connection with FIG. 6 may be maintained for each thin device in an embodiment in accordance with techniques herein.

A LUN tier preference table 620 is also provided and may be used to set and identify LUN tier preference for a thin LUN device or TD. The LUN tier preference table 630 may be maintained for each TD. The LUN tier preference table 620 may contain an entry for each LUN ID and identify which preference level the LUN is set to and if application configuration tiering set. For each entry or row of the LUN tier preference table 620 corresponding to a LUN, a first column, "LUN ID," denotes an identifier to uniquely identify the LUN, a second column, "level," indicates a level denoting the current tiering preference level, and a third column, "ACT tag," indicates if the LUN it 'tagged' as having application configuration (AC) tiering applied to the LUN. For example, the first row represents LUN A which has a high tiering preference level and AC set to yes, the second row represents LUN B which has an auto tiering preference level and AC set to yes, and the third row represents LUN C which has a low tiering preference level and AC set to no.

Figure 7:
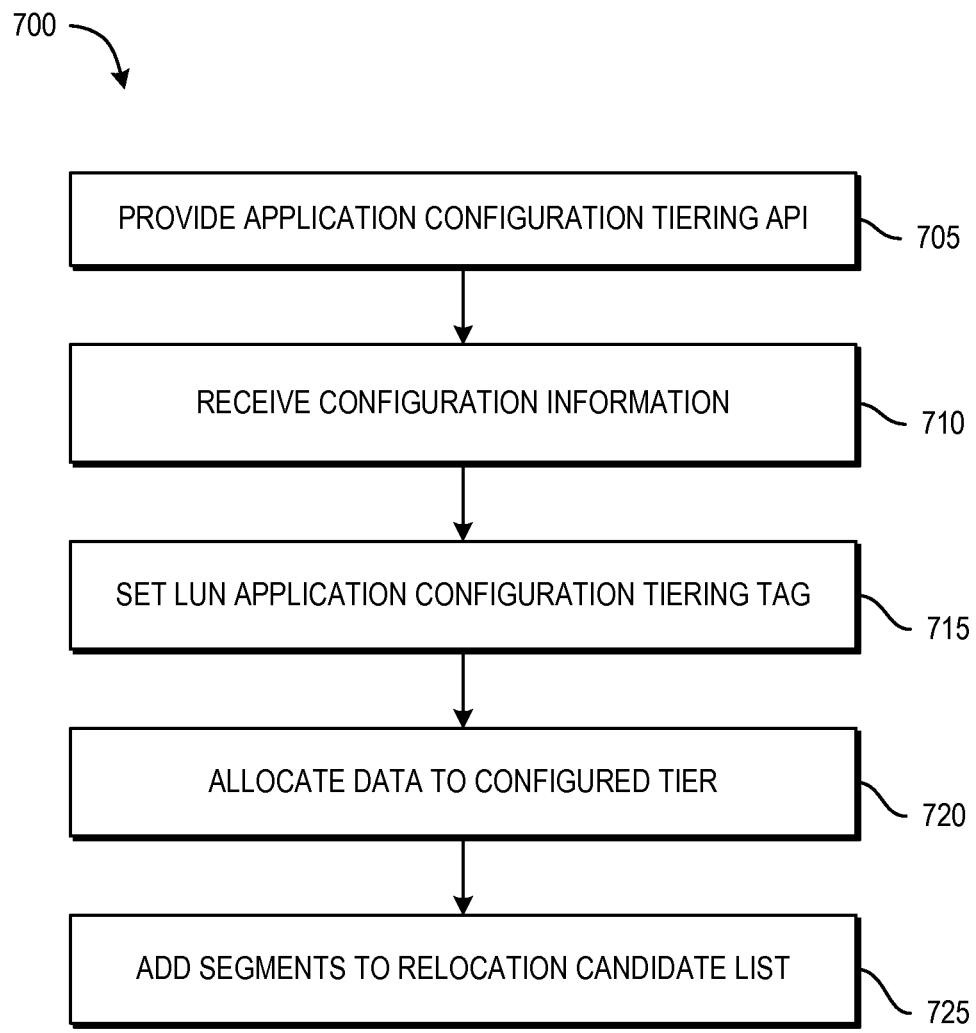
FIG. 7 is a flowchart of an example embodiment of a method for managing temporal data placement in a data storage system.

FIG. 7 is a flow diagram that illustrates an example method 700 for use in implementing techniques described herein for configuring and managing sub-LUN data segment tiering placement using out-of-band management that may be performed in conjunction with the FAST described herein. While various methods disclosed herein are shown in relation to a flowchart or flowcharts, it should be noted that any ordering of method steps implied by such flowcharts or the description thereof is not to be construed as limiting the method to performing the steps, or sub-steps within or among the steps, in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

With reference to FIGS. 4-6, the method 700 of FIG. 7 can begin at step 705 where one or more APIs such as the host agent 130 shown in FIG. 4 is provided and may be installed on the host 102. The APIs are configured to enable a host and/or user ("user") application 160 to specify tiering preferences for particular sub-LUN segments of data associated with a user application 160. The application tiering preference may be configured to take precedence or override LUN tier preferences for sub-LUN segments specified by the user application. The API can be configured to specify a LUN identifier and one or more sub-LUN data segments such as was described in FIGS. 5 and 6. For example, LBA 10-50 for LUN A can be set to tier 0 and LBA 150-300 can be set to tier 1 for LUN B.

At step 710, the array may receive the application configuration tiering information from the host API for use in configuring sub-LUN segment preferences. The application configuration tiering information may be communicated using an out-of-band communication channel 150 and received via a DSS management port 122 as was described in FIG. 4.

At step 715, if any sub-LUN segment of a respective LUN is configured for application configuration tiering, its LUN tiering preference will be 'tagged' as application configuration tiering. In this way, application configured tiering is configured to override the LUN's tiering preference for only sub-LUN segments configured as such. All other data in the LUN follows the LUN's tiering preference. For example, for a LUN having a preference of auto where a sub-LUN segment has an application configuration tiering setting of tier 0 (i.e., high), the sub-LUN segment will remain in the high tier, regardless if auto tiering determines the sub-LUN segment is warm or even cold. Thus, application configuration tiering overrides any corresponding LUN tiering preference.

At step 720, when data is allocated from the host, the array may identify the mapped LUN and then map and allocate the sub-LUN data segment to the proper tier according to the tiering information provided by the API. In example embodiments, tiering preference may be best effort. For example, when there is no space available on tier 0 (e.g., the highest tier SSD drives), data segments with the highest tiering preference may be placed on the next highest tier (e.g., SAS drives).

At step 725, during FAST VP analysis, data segments that are not in the preferred tier are put into relocation candidate list and may be relocated to proper tier. Like the initial data placement, the "Application Configured Tiering" takes precedence over its corresponding LUN tiering preference setting. For example, when the top performance tier is full, some data segments of a LUN with "highest preferred" tiering preference are moved out of the top tier to make room for a sub-LUN data segments of "Application Configured Tiering" LUN having "highest preferred" preference.

Figure 8:
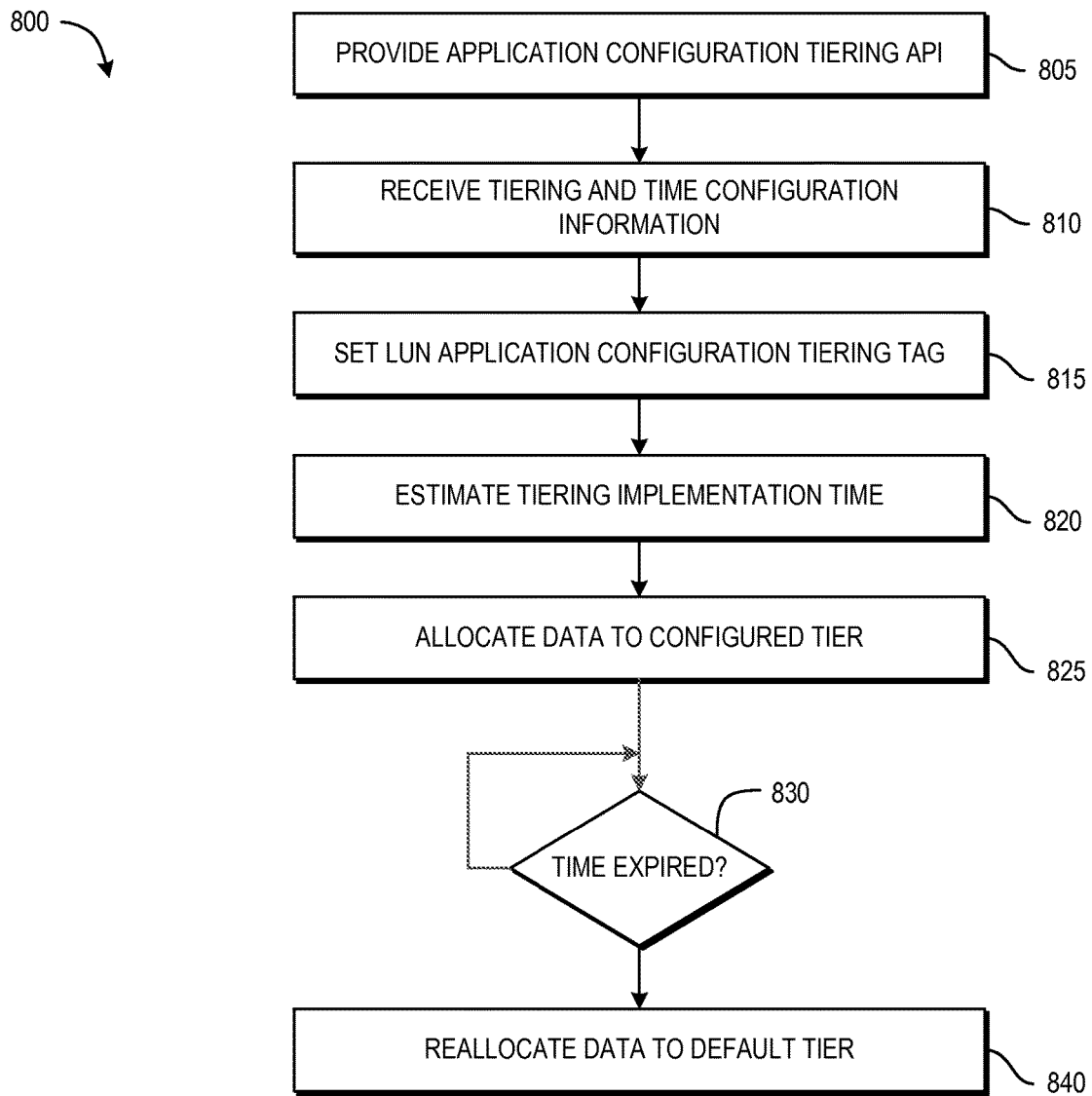
FIG. 8 is a flowchart of an example embodiment of a method for managing temporal data placement in a data storage system.

FIG. 8 is a flow diagram that illustrates an example method 800 for use in implementing techniques described herein for configuring and managing sub-LUN data segment time-based tiering placement using out-of-band management that may be performed in conjunction with the FAST VP techniques described herein.

With reference to FIGS. 4-6, the method 800 of FIG. 8 can begin at step 805 where one or more APIs such as the host agent 130 shown in FIG. 4 is provided and may be installed on the host 102. One or more APIs are configured to enable a host and/or user ("user") application 160 to specify tiering preferences and corresponding time parameter for particular sub-LUN data segments selected by a user application 160 in conjunction with the API. The application tiering preference may be configured to take precedence or override LUN tier preferences for sub-LUN segments specified by the user application during the specified time period. Thus, the API can be configured to specify a LUN identifier, one or more sub-LUN data segments, and a time value. Time parameters can contain one or more values such that the time the application tiering preference is applied can be defined in an almost unlimited variety of scenarios including, but not limited to, one-time events, fixed number of events, periodic, aperiodic, formulaic, calendar based, application IO load/pattern, and the like. Multiple events can also be combined as well.

At step 810, the array may receive the application configuration tiering and timing information from the host API for use in configuring sub-LUN segment preferences. The application configuration tiering and timing information may be communicated using an out-of-band communication channel 150 and received at the data storage system via, for example, a DSS management port 122 as was described in FIG. 4.

At step 815, if any sub-LUN segment of a respective LUN is configured for application configuration tiering, its LUN tiering preference will be 'tagged' as application configuration tiering. In this way, application configured tiering is configured to override the LUN's tiering preference for only sub-LUN segments for the specified time period. All other data in the LUN follows the LUN's tiering preference. For example, for a LUN having a preference of auto where a sub-LUN segment has an application configuration tiering setting of tier 0 (i.e., high), the sub-LUN segment will remain in the high tier during the specified time period, even if auto tiering determines the sub-LUN segment is cold. Thus, during the specified time period, application configuration tiering overrides any corresponding LUN tiering preference.

At step 820, the time to implement data relocation is estimated to ensure that the data earmarked for a particular tier is relocated to that tier at the start of the time period. In one example, the FAST VP mechanisms described above track current data segment locations and relocation time during standard FAST VP analysis functions. Based on the analysis information and current relocation speed history, FAST VP can estimates how long it will take to move the data segments to a particular tier. For example, the analysis may estimate that it will take 2 hours to move data in specified LBA ranges. Thus, 2 hours before the API configured window (last week of the quarter, in the above example), FAST VP can internally schedule a relocation to move data segments to the API configured tier locations.

At step 825, when data is allocated from the host, the array may identify the mapped LUN and then map and allocate the sub-LUN data segment to the proper tier according to the tiering and timing information provided by the API taking into account the estimated time to implement. In example embodiments, tiering preference may be best effort. For example, when there is no space available on tier 0 (e.g., the highest tier SSD drives), data segments with the highest tiering preference may be placed on the next highest tier (e.g., SAS drives). Alternatively, or in addition, tiering preference may force relocation of data in the target tier so as to free up sufficient space for the data segments.

At step 830, the method determines if the time period has expired, and if not, the data segments remain in place in the application specified tier. During the API specified time period, the application configured tiering data segments will be treated as "no movement" to ensure the data is "pinned" to the tier current location. Once the time period expires, at step 840, the data segments are relocated back to the tier from which they came (e.g., the corresponding LUN tiering preference). In some embodiments, if data was relocated to make room for the data segments, the relocated data that was in the tier may be tagged for relocation back to the tier after the time period expires. Alternatively, the vacated tier storage can be populated according to FAST VP mechanisms.

In some embodiments, during FAST VP analysis, data segments that are still active (i.e., their time period is not expired) and are not in the preferred tier are put into relocation candidate list and may be relocated to proper tier. As stated above, the application configured tiering" takes precedence over its corresponding LUN tiering preference setting. Thus, if the target tier is full, some data segments of a LUN with "highest preferred" tiering preference are moved out of the target tier to make room for sub-LUN data segments having active time periods.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, an optical disk, computer memory, flash memory, etc., for example memory 38 in FIG. 10) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. § 102 or 35 U.S.C. § 103, such determination being a legal determination that depends upon many factors, not all of which are known to Applicants at this time.

What is claimed is:

1. A method for managing temporal data placement in a data storage system, the method comprising:
   providing an application program interface (API), wherein a host application is configured to communicate sub-LUN data segment location information, application configuration tiering information and timing parameter to the API;
   transmitting, via an out-of-band communications path, the sub-LUN data segment location information, application configuration tiering information and timing parameter to a data storage system management port that is separate from a data storage system data port;
   receiving, at the data storage system management port, the sub-LUN data segment location information, application configuration tiering information and timing parameters and mapping the information to the corresponding LUN;
   generating a timing estimate for implementing sub-LUN data segment relocation, wherein the estimate is based on data storage system derived tiering information and recent relocation timing information;
   based on the timing estimate, scheduling relocation of the sub-LUN data segment such that the sub-LUN data segment is relocated to a tier corresponding to the application configuration tiering information during the time period associated with the timing parameter; and
   relocating the sub-LUN data segment back to the tier from which it was previously located upon expiration of the time period.

2. The method of claim 1, wherein a fully automated storage tiering for virtual pools (FAST VP) mechanism triggers relocating the sub-LUN data segment back to the tier from which it was previously located.

3. The method of claim 1, wherein the sub-LUN data segment location information includes logical block address (LBA) information indicating the location of the sub-LUN data segment in its corresponding LUN.

4. The method of claim 1, wherein application configuration tiering information corresponds to a high performance storage tier, a low performance storage tier or an auto tier.

5. The method of claim 1, wherein data segment associated with application configured tiering is pinned to its current location and not allowed to relocate while the time period is active.

6. The method of claim 1, further comprising:
   transmitting, via an in-band management path communicatively coupling the host and the data storage system, the sub-LUN data segment to the data storage system.

7. The method of claim 1, wherein the application configured tiering has priority over the LUN tiering preference.

8. The method of claim 1, wherein the LUN tiering preference is one of a high tier, an auto tier, or a low tier.

9. The method of claim 1, further comprising:
   determining the sub-LUN data segment is not in a preferred tier and adding the data segments to a relocation candidate list.

10. A system for managing temporal data placement in a data storage system, the system configured to:
    provide an application program interface (API), wherein a host application is configured to communicate sub-LUN data segment location information, application configuration tiering information and timing parameter to the API;
    transmit, via an out-of-band communications path, the sub-LUN data segment location information, application configuration tiering information and timing parameter to a data storage system management port that is separate from a data storage system data port;
    receive, at the data storage system management port, the sub-LUN data segment location information, application configuration tiering information and timing parameter and associating the information with the corresponding LUN;
    generate a timing estimate for implementing sub-LUN data segment relocation, wherein the estimate is based on system derived tiering information and recent relocation timing information;
    based on the timing estimate, schedule relocation of the sub-LUN data segment such that the sub-LUN data segment is relocated to a tier corresponding to the application configuration tiering information during the time period associated with the timing parameter; and
    relocating the sub-LUN data segment back to the tier from which it was previously located upon expiration of the time period.

11. The system of claim 10, wherein a fully automated storage tiering for virtual pools (FAST VP) mechanism triggers relocating the sub-LUN data segment back to the tier from which is previously located.

12. The system of claim 10, wherein the sub-LUN data segment location information includes logical block address (LBA) information indicating the location of the sub-LUN data segment in its corresponding LUN.

13. The system of claim 10, wherein application configuration tiering information corresponds to a high performance storage tier, a low performance storage tier or an auto tier.

14. The system of claim 10, wherein data segment associated with application configured tiering is pinned to its current location and not allowed to relocate while the time period is active.

15. The system of claim 10, further comprising:
    transmitting, via an in-band management path communicatively coupling the host and the data storage system, the sub-LUN data segment to the data storage system.

16. The system of claim 10, wherein the application configured tiering has priority over the LUN tiering preference.

17. The system of claim 10, wherein the LUN tiering preference is one of a high tier, an auto tier, or a low tier.

18. The system of claim 10, further comprising:
   determining the sub-LUN data segment is not in a preferred tier and adding the data segments to a relocation candidate list.

\* \* \* \* \*